Aug. 16, 1960     J. H. LEMELSON     2,949,531
ILLUMINATED HIGHWAY MARKER

Filed Sept. 6, 1955

INVENTOR.
Jerome H. Lemelson

United States Patent Office 2,949,531
Patented Aug. 16, 1960

2,949,531

ILLUMINATED HIGHWAY MARKER

Jerome H. Lemelson, 8B Garfield Apt., Metuchen, N.J.

Filed Sept. 6, 1955, Ser. No. 532,552

3 Claims. (Cl. 240—81)

This invention relates to a lighted display or warning device which may be used as a highway marker and a traffic warning and directional signal. More specifically the invention concerns a light emitting device which may be placed on a roadway immediately adjacent traffic without danger of damage to or from a vehicle in the event of a collision therewith.

A number of types of highway markers are presently employed to warn motorists of dangerous road conditions. Oil burning spherical signal pots have been in use for many years but present numerous disadvantages, namely the danger of fire due to the open flame provided thereby. Electrically operated flashing lamps have been employed in sheet metal housings and these have been mounted on tubular frames and signs positioned at the side of the roadway. However, the application of such lamp signalling device has heretofore been limited to placement where there will be no possibility of collision between said lamps and passing vehicles which would destroy or damage the housing and lamps and cause damage to the vehicle.

Accordingly, it is a primary object of this invention to provide a portable highway warning device or marker having a light source and battery incorporated therewith, which is relatively safe to employ on roadways immediately adjacent traffic.

Another object is to provide a new and improved highway marker having a light-source associated therewith for warning approaching motorists of hazardous road conditions which will not be easily damaged or destroyed if struck or run over by a vehicle and conversely, will not damage said vehicle.

Still another object is to provide a new and improved portable highway marker device having a light source and battery mounted in a housing which is secured to a resilient base which supports said housing in a stable condition a predetermined distance off the ground.

Yet another object is to provide a portable highway warning signal having a light source and battery secured in a housing which is secured to a flexible base having resilient walls which may be collapsed, if struck by a vehicle, without damage, said housing being designed and secured to said flexible base in such a manner that the resilient walls of said base will not be destroyed if pinched between said housing and the wheel of a motor vehicle.

Still another object is to provide an improved highway marker device including a light source mounted in a housing at least part of which is a transparent window or lens for transmitting said light to the exterior of said housing, said device including means for protecting the window portion of said housing and preventing its damage if struck or knocked down by a passing vehicle.

Another object is to provide improved structures in lighted highway markers utilizing totally enclosed light sources in housings which are capable of being run over by motor vehicles without damage and are weatherproof.

Still another object is to provide an electrical highway warning marker which is portable, light in weight and easily stored.

Other objects and advantages will become more readily apparent from the following description and accompanying illustrative drawings.

Figure 1:
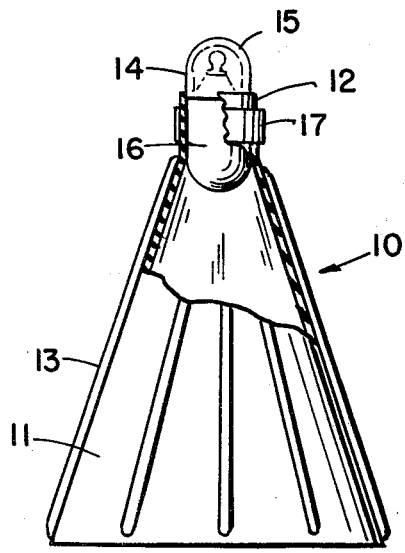
Fig. 1 is an elevation with parts broken away for clarity of a portable, illuminated highway marker.
Figure 2:
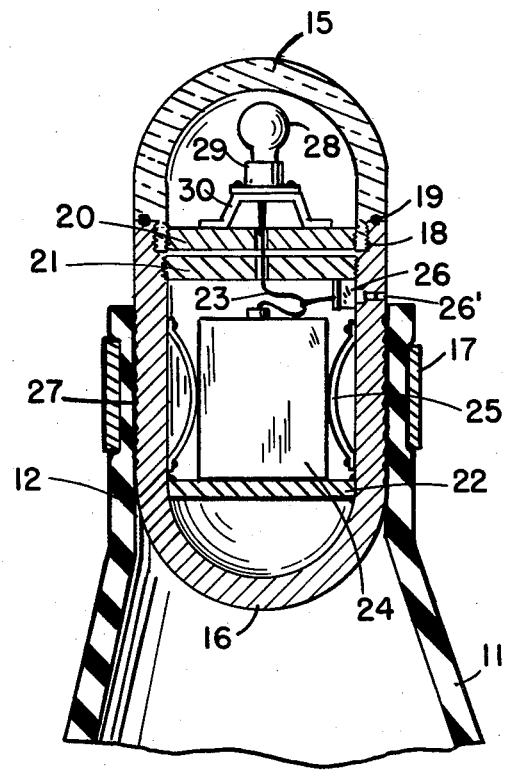
Fig. 2 is a sectional view of the upper portion of Fig. 1.
Figure 3:
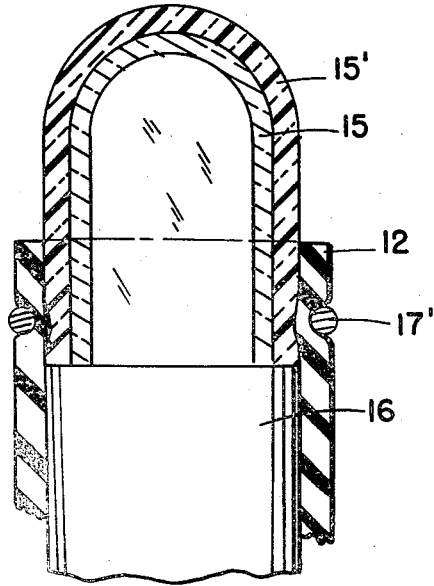
Fig. 3 is a side view in partial cross-section showing a modification to the assembly and housing of the device of Figs. 1 and 2.

Figs. 1–3 show a lighted display device applicable for use on roadways and the like, said device being particularly designed to withstand the extreme abuse rendered roadway standing displays when they are struck by passing vehicles or are run over by the wheels thereof. The display 10 comprises an assembly of a flexible shell support or base 11 having a rigid enclosure 14 secured to the upper end thereof in which an electric lamp 28 is mounted, the light from which is viewable to passing vehicles. The stand 11 is preferably made of rubber or rubber like plastic such as semi-rigid plasticized polyvinyl chloride. While said stand 11 is of sufficient rigidity to support said enclosure 14, it is flexible enough to be completely collapsed on itself, bent or twisted by being run over by rubber tired wheels of a vehicle without permanent deformation or damage. In a preferred form of the invention, said base 11 is a frusto conical shell extending to a tubular upper section 12 at the reduced upper end thereof which circumscribes and holds part of the housing 14. The base 11 may have any shape which is capable of stably supporting the housing 14 above the roadway, though the tapered conical shell is perhaps one of the most stable forms attainable at relatively low cost. The surface of 11 may be coated with reflective paint or reflex reflecting material rendering the display as a whole more visible at night, with or without the light source within 14 functioning. The notation 13 refers to ribs or sections of increased cross-section extending from the base of the shell 11 to near or along said tubular upper section 12 thereof. Said ribs 13 are preferably integrally formed with the base wall of 11 and add to the support of the upper secured housing 14 without the necessity of increasing the thickness of the whole base sheet 11 appreciably. The rigidity of the material of 11 is such that it will support 14 yet is capable of being completely collapsed on itself without cracking or permanently deforming, from the original shape.

Fig. 2 is a partly sectioned view of the upper end of the display which illustrates details of the enclosure 14 and the means for mounting said enclosure in an upright position on 11. It is noted that if said display is used as a warning signal device at the side of or in the center of a roadway, there will be occasions during which a passing vehicle will not only strike and run over the flexible shell base 11 but will also run over the rigid enclosure 14. I therefore provide a housing 14 for said light source which is not only capable of withstanding the forces imposed by the weight of a vehicle thereon, but is shaped such that, in the event it is run over by rubber tired wheels of ordinary roadway vehicles, the light housing 14 will not cause the shell 11 to be damaged thereby, nor will housing 14 damage the tires of said vehicle. I prefer to make the housing 14 either spherical in shape or in the oblong cylindrical shape illustrated with spherically shaped ends. It will thus be void of any sharp edges or projections which would ordinarily cause damage to 11 or the tires of a vehicle. Since it is required that a light source, mounted within 14 be viewable from the exterior of the housing, it is necessary that at least part of said housing be made of a transparent plastic or glass material. I prefer to make the entire upper section 15 of said housing out of relatively heavy walled glass or transparent plastic, so that the light from the lamp 28 mounted within said housing is viewable from 360° around the marker. This is of importance since the display 11 may be moved or shifted in position without tipping over by a passing vehicle. While the entire housing 14 may be made of thick walled glass or plastic, I illustrate the upper end 15 as being assembled with a heavy walled steel base or cast iron lower shell 16 which is further reenforced with internal supports in the form of plates 21 and 22, to strengthen it and prevent its collapsing if run over by a vehicle. The spherical end of 16 will prevent damage to the walls of base 11 and neck 12 while the spherical shape of the upper end 15 of the housing will prevent damage to the tires of a vehicle running thereover. Upper end 15 is secured to lower end 16 by providing a reduced section 18 at the lower end of 15 which is threaded and screws into a threaded internal bore in 16. The numeral 19 refers to a gasket such as an O-ring provided between mating end surfaces of 16 and 15, which prevents moisture and water from entering the enclosure. A lamp 28 is mounted in a socket 29 which is secured to a bracket 30. The bracket 30 is mounted on a disc shaped plate 20 with fasteners. The plate 20 screws into a threaded section of 15, and serves to radially reenforce the assembly in the manner that 21 and 22 reenforce 16. A conducting wire 23 passes through central openings in 20 and 21 and extends to the interior of the lower portion of the enclosure 14 which is bounded by the walls of 16. The numeral 24 refers to a removable housing in which a source of electrical energy such as a battery is mounted. Housing 24 rests on the plate 22 and is prevented from lateral shifting by two or more spring clips 25. The casing 24 may also contain a mechanism for causing the light 28 to flash on and off. If condenser discharge means are provided with an arc type lamp as the light source, the display may be operative for long periods of time with minimum battery drain. The numeral 26 refers to a switch which is accessible through hole 26' in the casing 16 to the outside thereof and is utilized to cut the battery within 24 out of circuit with said light flashing mechanism. The housing 14 may be secured to the upper end of base 11 in several manners. In Fig. 2 this is accomplished by dimensioning the diameter of the central cylindrical portion of said housing such that it either frictionally or slidably engages the inner walls of the tubular section 12 and by providing a circumscribing clamping ring 17 around 12 under sufficient tension to deform 12 against the outer surface of 16 so that the two are firmly held in engagement with each other. The ring 17 may be riveted together, secured with screw type fasteners which penetrate 12 and thread into 16 or may be force fitted over the end of 12 when the latter is assembled with 16. The numeral 27 refers to ridged or circumferentially ribbed portions of the housing projecting from the outer surface of 16 into which the rubber of 12 is deformed, which formation enhances the securing of 14 to neck portion 12 of 11.

Fig. 3 shows a means for enhancing the durability of the assembly of Fig. 2 by reducing the possibility of the upper transparent shell 15 chipping or cracking in the event that it is struck a glancing blow by objects such as flying stones or the bumpers or sides of automobiles. The shell 15 is provided with a thick cover 15' of a transparent plastic which is sufficiently flexible and thick enough to protect the rigid inner shell 15 from said blows. The 15' may be provided as a sleeve made of a plastic such as transparent plasticized polyvinyl chloride frictionally or slidably engaged on 15. The thickness of 15' preferably ranges in the order of ¼" to ¾" which is sufficient to absorb most of the shock of impact when struck by a moving vehicle or if the assembly impacts against the ground. Said cover renders protection for the wall of shell 15 which may be made of glass or a durable plastic such as epoxy resin. In Fig. 3 a wire ring 17' replaces the cylindrical ring 17 of Fig. 2 in the assembly and effects a seal across the interface of the inner surface of the neck 12 and the housing for the electric lamp.

I claim:

1. A portable illuminating highway marker device comprising in combination, an enclosure, a light source mounted within said enclosure, a support for said enclosure comprising a thin resilient wall structure defining a hollow tapered body whose broad end comprises a base for said device, said wall structure also defining a tubular neck portion of substantially constant diameter extending from the narrow end of said tapered body in a direction away from said base; said enclosure including a body portion engaged by and held in said neck portion of said support in an upright position, said enclosure also including rounded portions providing closures at both ends of said body portion whereby if said hollow tapered body is run over by the wheels of a motor vehicle and is collapsed thereby into contact with said enclosure, said enclosure will not penetrate the wall structure defining said hollow tapered body; a first of said rounded portions extending beyond said neck portion being constructed of transparent material; said light source being operatively positioned so as to be viewable for 360° around said housing.

2. A portable device as set forth in claim 1 in which the rounded portions at the ends of the enclosure are each of hemispherical shape of substantially the same radii.

3. A portable device as set forth in claim 1 in which at least the first of said rounded portions is provided with a covering of flexible plastic material.

References Cited in the file of this patent

UNITED STATES PATENTS

| | | |
|---|---|---|
| 1,835,218 | Holmgreen | Dec. 8, 1931 |
| 1,886,004 | Geyser | Nov. 1, 1932 |
| 2,095,609 | Long | Oct. 12, 1937 |
| 2,201,588 | Kuhns | May 21, 1940 |
| 2,272,802 | High | Feb. 10, 1942 |
| 2,646,638 | Peterson | July 28, 1953 |
| 2,677,755 | Moore | May 4, 1954 |
| 2,719,505 | Blumenthal | Oct. 4, 1955 |